(12) United States Patent
Alamro et al.

(10) Patent No.: US 11,127,539 B2
(45) Date of Patent: Sep. 21, 2021

(54) HIGH SPECIFIC CAPACITANCE SOLID STATE SUPERCAPACITOR AND METHOD OF MANUFACTURE

(71) Applicant: University of South Florida, Tampa, FL (US)

(72) Inventors: Turki Sulaiman A. Alamro, Germantown, MD (US); Manoj Kumar Ram, Palm Harbor, FL (US)

(73) Assignee: University of South Florida, Tampa, FL (US)

( * ) Notice: Subject to any disclaimer, the term of this patent is extended or adjusted under 35 U.S.C. 154(b) by 63 days.

(21) Appl. No.: 16/839,161

(22) Filed: Apr. 3, 2020

(65) Prior Publication Data

US 2020/0286689 A1   Sep. 10, 2020

Related U.S. Application Data

(63) Continuation of application No. PCT/US2018/054112, filed on Oct. 3, 2018.

(60) Provisional application No. 62/567,425, filed on Oct. 3, 2017.

(51) Int. Cl.

| | |
|---|---|
| *H01G 11/26* | (2013.01) |
| *H01G 11/32* | (2013.01) |
| *H01G 11/48* | (2013.01) |
| *H01G 11/52* | (2013.01) |
| *H01G 11/56* | (2013.01) |
| *H01G 11/86* | (2013.01) |

(52) U.S. Cl.
CPC ............ *H01G 11/26* (2013.01); *H01G 11/32* (2013.01); *H01G 11/48* (2013.01); *H01G 11/52* (2013.01); *H01G 11/56* (2013.01); *H01G 11/86* (2013.01)

(58) Field of Classification Search
None
See application file for complete search history.

(56) References Cited

U.S. PATENT DOCUMENTS

| 6,198,623 B1 | 3/2001 | Amatucci |
| 7,623,340 B1 | 11/2009 | Song et al. |
| 10,854,352 B1 * | 12/2020 | Ram ...................... B32B 38/10 |

(Continued)

OTHER PUBLICATIONS

Alvi et al., Graphene-Polythiophene Nanocomposite as Novel Supercapacitor Electrode Material, Journal of New Materials for Electrochemical Systems 15, 89-95 (2012).

(Continued)

*Primary Examiner* — Dion Ferguson
(74) *Attorney, Agent, or Firm* — Molly L. Sauter; Smith & Hopen, P.A.

(57) ABSTRACT

A novel electrode and associated method of manufacturing said novel electrode comprising a porous structure having absorbed polystyrene sulfonate (PSS), a self-assembled polypyrole (PPy) layer adjacent to the PSS absorbed porous structure, a self-assembled polyaniline (PANI) layer adjacent to the PPy layer, an electrochemically deposited PANI layer adjacent to the PPy layer and an electrochemically deposited PANI-molybdenum disulfide (PANI-MoS$_2$) layer adjacent to the electrochemically deposited PANI layer. A supercapacitor and associated method of manufacturing a supercapacitor comprising a first novel electrode and a second novel electrode separated by a polyvinyl gel and a porous separator.

20 Claims, 11 Drawing Sheets

(56) References Cited

U.S. PATENT DOCUMENTS

| | | | |
|---|---|---|---|
| 2015/0194667 A1 | 7/2015 | Chiu et al. | |
| 2016/0055983 A1 | 2/2016 | Kurungot et al. | |
| 2020/0358090 A1* | 11/2020 | Jang | H01M 50/449 |
| 2020/0365902 A1* | 11/2020 | Jang | H01M 4/366 |
| 2021/0171352 A1* | 6/2021 | Ram | B01J 13/0065 |

OTHER PUBLICATIONS

Alvi et al., Graphene-polyethylenedioxythiophene conducting polymer nanocomposite based supercapacitor, Electrochimica Acta 56, 9406-9412 (2011).

Alamro et al. Polyethylenedioxythiophene and molybdenum disulfide nanocomposite electrodes for supercapacitor applications, Electrochimica Acta 235, 623-631 (2017).

Basnayaka et al., Nanostructured Hybrid Graphene-Conducting Polymers for Electrochemical Supercapacitor Electrodes, Handbook of Nanoelectrochemistry, 479-501 (2016).

Basnayaka et al., Graphene/Polypyrrole Nanocomposite as Electrochemical Supercapacitor Electrode Electrochemical Impedance Studies, Graphene, 2, 81-87 (2013).

Basnayaka et al., A ReviewofSupercapacitor Energy Storage Using Nanohybrid Conducting Polymers and Carbon Electrode Materials, Conducting PolymerHybrids, 165-192 (2017).

Basnayaka et al., Supercapacitors based on graphene-polyaniline derivative nanocomposite electrode materials, Electrochimica Acta 92, 376-382 (2013).

Basnayaka et al., Poly (acrylic acid)—mediated soft template synthesis of Poly (3, 4-ethylenedioxythiophene)-based conducting polymer nanostructures for supercapacitor applications, Mater. Res. Soc. Symp. Proc. vol. 1497 (2013).

Basnayaka et al., High performance graphene-poly (o-anisidine) nanocomposite for supercapacitor applications, Materials Chemistry and Physics 141, 263-271 (2013).

Basnayaka et al.. High Performance Asymmetric Supercapacitors Based on Dual Phosphorus (P) and Nitrogen (N) co-Doped Carbon and Graphene-Polyaniline Electrodes, ECS Journal of Solid State Science and Technology, 6 (6) M3168-M3172 (2017).

Chen et al., High-Performance Nanostructured Supercapacitors on a Sponge, Nano Lett. 11, 5165-5172 (2011).

Chen et al.. Synthesis of Nitrogen-Doped Porous Carbon Nanofibers as an Efficient Electrode Material for Supercapacitors, ACS NANO, 6 (6) 7092-7102 (2012).

Gomez et al.. Graphene-conducting polymer nanocomposite as novel electrode for supercapacitors, Journal of Power Sources 196, 4102-4108 (2011).

Jung et al.. Controlled porous structures of graphene aerogels and their effect on supercapacitor performance, Nanoscale, 7, 4386 (2015).

Kang et al., All-Solid-State Flexible Supercapacitors Fabricated with Bacterial Nanocellulose Papers, Carbon Nanotubes, and Triblock-Copolymer Ion Gels, ACS NANO, 6 (7) 6400-6406 (2012).

Lee et al., Activated carbon aerogel containing graphene as electrode material for supercapacitor, Materials Research Bulletin 50, 240-245 (2014).

Miller et al., Electrochemical Capacitors for Energy Management, Science, 321, 651-652 (2008).

Wang et al., Constructing a "Pizza Like" $MoS_2$/Polypyrrole/Polyaniline Ternary Architecture with High Energy Density and Superior Cycling Stability for Supercapacitors, Advanced Materials Interfaces, 3, 1600665 (2016).

Zhang et al., Electrosynthesis and Capacitive Performance of Polyaniline-Polypyrrole Composite, Polymer Composites (2011).

Tao et al., High-Performance Solid-State Supercapacitors Fabricated by Pencil Drawing and Polypyrrole Depositing on Paper Substrate, Nano-Micro Lett., 7(3):276-281 (2015).

Zang et al., Design and fabrication of an all-solid-state polymer supercapacitor with highly mechanical flexibility based on polypyrrole hydrogel, ACS Appl. Mater. Interfaces, 9, 39, 33941-33947 (2017).

Xu et al., Electrochemical Supercapacitor Electrodes from Sponge-like Graphene Nanoarchitectures with Ultrahigh Power Density, J. Phys. Chem. Lett., 3, 2928-2933 (2012).

Ram et al., Nano-assembly of glucose oxidase on the in situ self-assembled films of polypyrrole and its optical, surface and electrochemical characterizations, Nanotechnology 11, 112-119 (2000).

Ram et al., CO gas sensing from ultrathin nano-composite conducting polymer film, Sensors and Actuators B 106, 750-757 (2005).

Ram et al., Physical Properties of Polyaniline Films: Assembled by the Layer-by-Layer Technique, Langmuir, 15, 1252-1259 (1999).

Ram et al., $NO_2$ gas sensing based on ordered ultrathin films of conducting polymer and its nanocomposite, Synthetic Metals 151, 77-84 (2005).

Ram et al., Physical insight in the in-situ self-assembled films of polypyrrole, Polymer 41, 7499-7509 (2000).

Sarkar et al., Nanoassemblies of sulfonated polyaniline multilayers, Nanotechnology 11, 30-36 (2000).

Xiao et al., Fiber-Based All-Solid-State Flexible Supercapacitors for Self-Powered Systems, ACS Nano, (6) 10, 9200-9206 (2012).

Xu et al., A Hierarchical Carbon Derived from Sponge-Templated Activation of Graphene Oxide for High-Performance Supercapacitor Electrodes, Adv. Mater. 28, 5222-5228 (2016).

International Search Report and Written Opinion issued for PCT International Application No. PCT/US18/54112 dated Dec. 14, 2018.

International Preliminary Report on Patentability issued for PCT International Application No. PCT/US18/54112 dated Apr. 16, 2020.

* cited by examiner

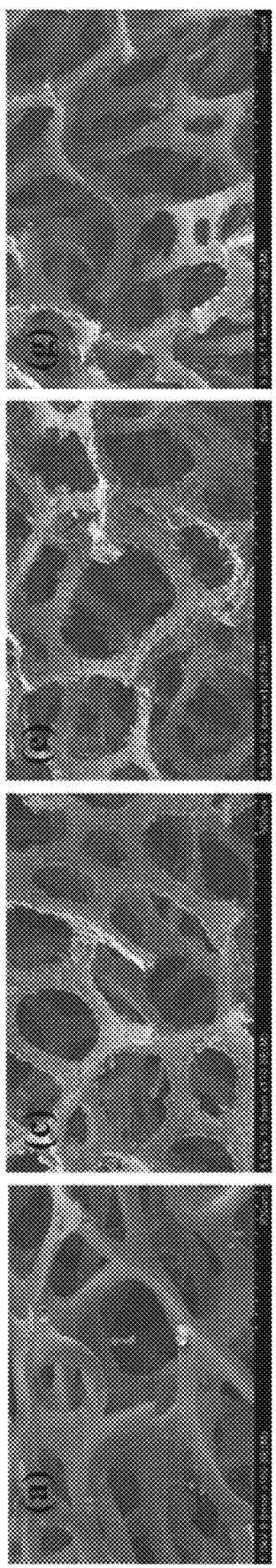
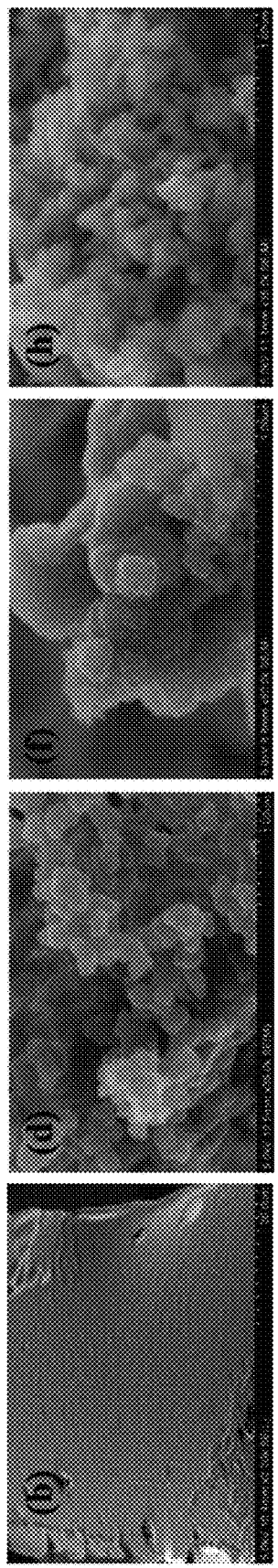
FIG. 5A  FIG. 5B  FIG. 5C  FIG. 5D  FIG. 5E  FIG. 5F  FIG. 5G  FIG. 5H

HIGH SPECIFIC CAPACITANCE SOLID STATE SUPERCAPACITOR AND METHOD OF MANUFACTURE

CROSS-REFERENCE TO RELATED APPLICATIONS

This application is a continuation of and claims priority to PCT International Application No. PCT/US2018/054112, filed Oct. 3, 2018 and entitled "High Specific Capacitance Solid State Supercapacitor and Method of Manufacture," which claims priority to U.S. Provisional Patent Application No. 62/567,425, filed Oct. 3, 2017 and entitled "High Specific Capacitance in Solid State Supercapacitor," both of which are herein incorporated by reference in entirety.

BACKGROUND OF INVENTION

Supercapacitors have been one of the emerging energy storage technologies with potential applications in small electronics, hybrid vehicles, solar and wind farms. The key factors in a supercapacitor are specific capacitance, specific power, and specific energy which are all largely dependent upon the nature of electrode materials. To obtain high performance in a supercapacitor, the electrodes of the device have to be porous with high surface to volume ratio and high conductivity. Also, for employing the pseudocapacitive effect for enhancing a device capacitance, the electrode material should present an excellent electrochemical redox stability at a wide potential window. High specific capacitances have been reported in devices made of nanocomposites of a conducting polymer with graphene, $MoS_2$, and carbon nanotubes.

A practical method to enhance the porosity of the electrodes is to coat the composite materials on the surface of a cellulose or sponge structure, such as a solid-state supercapacitor fabricated with large surface area based carbon nanotubes on bacterial nanocellulose in poly(styrene-block-ethylene oxide-block-styrene) based ionic liquid electrolyte. The electrodes based on carbon nanotubes on bacterial nanocellulose had a specific capacitance of (50 F $g^{-1}$). Porous nitrogen doped carbon fibers showed a specific capacitance of 202 F $g^{-1}$. A volumetric capacitance of 2.5 F $cm^{-3}$ in a solid-state supercapacitor based on carbon fiber and manganese oxide core-shell fiber electrode have also been demonstrated. Graphene meso and microporous aerogels-based supercapacitor showed a specific capacitance of 325 F $g^{-1}$ in a sulfuric-based electrolyte. A supercapacitor fabricated on a 3D sponge like nano-structure coated with functionalized multi-walled carbon nanotubes had an energy density of 7.1 Wh $kg^{-1}$ and a power density of 48 kW $kg^{-1}$ in an ionic liquid-based electrolyte. A power density of 63 kW $kg^{-1}$ and energy density of 31 Wh $kg^{-1}$ with a manganese oxide and carbon nanotube sponge-based supercapacitor has also been reported. It is also known to fabricate supercapacitors by coating graphene oxide on polyurethane based sponge, resulting in an energy density of 89 W h $kg^{-1}$.

The common approach with aerogel or sponge-based substrates is to dip the substrate in a conductive ink or to mechanically press a conductive powder (e.g. carbon nanotubes or graphene) to the substrate to make conductive porous electrodes. Despite the simplicity of the process, the electrode conductivity may differ in various parts of the substrate, thereby negatively influencing the properties of a supercapacitor made by such a process.

Accordingly, what is needed in the art is an improved solid-state supercapacitor and associated method for manufacturing a solid-state supercapacitor.

SUMMARY OF THE INVENTION

In various embodiments, the present invention provides an improved supercapacitor comprising a common sponge which provides a large surface area upon which to fabricate a solid-state supercapacitor. The supercapacitor includes two substantially symmetric electrodes separated by a polyvinyl (PVA) layer. The two electrodes are provided by depositing conducting polypyrrole (PPy) and polyaniline (PAM) on the surface of sponge using in-situ self-assembled polymerization technique, wherein the PPY and PANI layers establish conductivity within the sponge. Subsequently, electrochemical PANI and molybdenum disulfide ($MoS_2$)-PANI are deposited by electrochemical techniques to form the electrodes. The polyvinyl alcohol (PVA) gel is then synthesized and further, polyaniline, polyaniline-graphene and polypyrrole, polypyrrole graphene are polymerized in PVA gel to obtain highly conducting electrolyte to fabricate the solid-state supercapacitor.

In one embodiment, an electrode of the present invention includes, a porous structure having absorbed polystyrene sulfonate (PSS), a self-assembled polypyrole (PPy) layer adjacent to the PSS absorbed porous structure, a self-assembled polyaniline (PANI) layer adjacent to the PPy layer, an electrochemically deposited PANI layer adjacent to the PPy layer and an electrochemically deposited PANI-molybdenum disulfide (PANI-$MoS_2$) layer adjacent to the electrochemically deposited PANI layer.

The porous structure may be selected from a sponge, an organic sponge, open-cell polyurethane form polystyrene, wood, foam, honeycomb ceramics, coral, pumice, porous ceramics and aerogel.

Additionally, the PANI layers may include one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide ($TiO_2$), tungsten oxide ($WO_3$), nanodiamond, zinc oxide over polyaniline film.

In another embodiment, the present invention provides a supercapacitor including a first electrode and a second electrode separated by polyvinyl alcohol (PVA) layer and a separator. The first electrode and the second electrode including a porous structure having absorbed polystyrene sulfonate (PSS), a self-assembled polypyrole (PPy) layer adjacent to the PSS absorbed porous structure, a self-assembled polyaniline (PANI) layer adjacent to the PPy layer, an electrochemically deposited PANI layer adjacent to the PPy layer and an electrochemically deposited PANI-molybdenum disulfide (PANI-$MoS_2$) layer adjacent to the electrochemically deposited PANI layer.

The supercapacitor may further include a graphite sheet/copper tape layer adjacent to the PSS porous structure of the first electrode and the second electrode.

In another embodiment, the present invention provides a method for manufacturing an electrode which includes, contacting a porous structure with a polyanion solution of polystyrene sulfonate (PSS) to form a porous structure/PSS substrate, performing in-situ self-assembly polymerization of pyrrole (PPy) on the porous structure/PSS substrate to form a porous structure/PSS/PPy substrate, performing in-situ self-assembly polymerization of polyaniline (PANI) on the porous structure/PSS/PPy substrate to form a porous structure/PSS/PPy/PANI substrate, electrochemically depositing a layer of PANI on the porous structure/PSS/PPy/PANI substrate to form a porous structure/PSS/PPy/PANI/PANI substrate and electrochemically depositing a polyaniline molybdenum disulfide (PANI-$MoS_2$) layer over the porous structure/PSS/PPy/PANI/PANI substrate to form a porous structure/PSS/PPy/PANI/PANI/PANI-$MoS_2$ electrode.

A method for manufacturing a supercapacitor is additionally provided which includes, manufacturing a first electrode and a second electrode by the process including, contacting a porous structure with a polyanion solution of polystyrene sulfonate (PSS) to form a porous structure/PSS substrate, performing in-situ self-assembly polymerization of pyrrole (PPy) on the porous structure/PSS substrate to form a porous structure/PSS/PPy substrate, performing in-situ self-assembly polymerization of polyaniline (PANI) on the porous structure/PSS/PPy substrate to form a porous structure/PSS/PPy/PANI substrate, electrochemically depositing a layer of PANI on the porous structure/PSS/PPy/PANI substrate to form a porous structure/PSS/PPy/PANI/PANI substrate and electrochemically depositing a polyaniline molybdenum disulfide (PANI-$MoS_2$) layer over the porous structure/PSS/PPy/PANI/PANI substrate to form a porous structure/PSS/PPy/PANI/PANI/PANI-$MoS_2$ electrode. The method further includes, applying a first polyvinyl (PVA) gel layer to the PANI-$MoS_2$ layer of the porous structure/PSS/PPY/PANI/PANI/PANI-$MoS_2$ first electrode, positioning a separator on the PVA gel layer, applying a second PVA gel layer between the separator and the PANI-$MoS_2$ layer of the porous structure/PSS/PPY/PANI/PANI/PANI-$MoS_2$ second electrode, positioning a first graphite sheet covered with copper tape on an exterior side of the first electrode and positioning a second graphite sheet covered with copper tape on an exterior side of the second electrode to form the supercapacitor.

In a particular embodiment, the supercapacitor can be a large surface area based sponge/polystyrene sulfonate (PSS)/polypyrrole (PPY)/polyaniline (PANI)/PANI-molybdenum disulfide ($MoS_2$)-poly(vinyl alcohol) (PVA)-PANI-$MoS_2$/PANI/PPY/PSS Sponge based solid state supercapacitor.

In an additional embodiment, the supercapacitor can be large surface area based sponge/polystyrene sulfonate (PSS)/polypyrrole (PPY)/polyaniline (PANI)/PANI-molybdenum disulfide ($MoS_2$)-(PVA-gel & graphene) polymerized with PANI-poly(vinyl alcohol) (PVA)-gel-PANI-$MoS_2$/PANI/PPY/PSSSponge based solid state supercapacitor.

In another embodiment, the supercapacitor can be a large surface area based sponge/polystyrene sulfonate (PSS)/polypyrrole (PPY)/polyaniline (PANI)/PANI-molybdenum disulfide ($MoS_2$)-(PVA-gel & graphene) polymerized with PPY-PANI-$MoS_2$/PANI/PPY/PSS/sponge containing based electrolyte and assembly of solid state supercapacitor.

In a particular embodiment, the poly(vinyl alcohol) (PVA) gel may be synthesized in acid. The PVA-gel may be mixed with aniline monomer, graphene and later, added with solution containing ammonium perdisulphate dissolved in 1M HCl. The aniline may be polymerized over PVA-gel and graphene and results tino a gel of PVA-PANI-graphene. Similarly, PVA-PPY-graphene, PVA-polythiophene-graphene, gel can be prepared. The gel can be prepared from one or mixtures of polyvinyl alcohol, poly (vinyl acetate, poly (vinyl alcohol co-vinyl acetate), poly (methyl methacrylate, poly (vinyl alcohol-co-ethylene ethylene), poly (vinyl butyral-co-vinyl alcohol-co-vinyl acetate), polyvinyl butyral, polyvinyl chloride, polystyrene. The combination of each polymer at different proportions can also be used for fabrication of PVA-gel used for making supercapacitor. The gel mixed polyaniline, polyaniline-graphene and polypyrrole, polypyrrole graphene may be polymerized in PVA gel to obtain highly conducting electrolyte to fabricate the solid state supercapacitor.

In a specific embodiment, wherein the porous structure is a sponge, the electrode can be fabricated for such structures as sponge/PSS/PPY/PANI/PPY-$MoS_2$, sponge/PSS/PPY/PPY/PANI-$MoS_2$, sponge/PSS/PPY/PPY/polythiophene-$MoS_2$, sponge/PSS/PPY/PPY/poly(o-anisidine)-$MoS_2$, sponge/PSS/PPY/PPY/poly (o-toluidine)-$MoS_2$, sponge/PSS/PPY/PPY/PPY-$MoS_2$, sponge/PSS/PPY/PPY/poly(o-ethoxyaniline)-$MoS_2$, sponge/PSS/PPY/PPY/substituted-$MoS_2$, sponge/PSS/PPY/PPY/PPY-PANI-$MoS_2$, sponge/PSS/PPY/PPY/PPY-$MoS_2$, sponge/PSS/PPY/PANI/PPY-$MoS_2$, sponge/PSS/PPY/PANI/substituted PPY-$MoS_2$, sponge/PSS/PPY/PANI/PPY-$WS_2$, sponge/PSS/PPY/PANI/substituted PANI-$WS_2$, sponge/PSS/PPY/PANI/PPY-$WS_2$, sponge/PSS/PPY/PANI/substituted PPY-graphene, sponge/PSS/PPY/PANI/PPY-graphene, sponge/PSS/PPY/PANI/substituted PANI-Carbon nanotube (CNTs), sponge/PSS/PPY/PANI/substituted PPY-CNTs, the mixed PPY, PANI and polythiophene or mixture layers can be fabricated.

Additionally, sponge/PSS/PPY/PANI/PPY-$MoS_2$-PVA-gel-$MoS_2$-PANI/PPY PANI/PPY/PSS/sponge symmetric or sponge/PSS/PPY/PANI/PPY-$MoS_2$-PVA-gel-$MoS_2$-PPY/PPY/PSS/sponge supercapacitor may be formed. The combinations can be made from the gel mixtures described above. The PVA-gel consisting of polyaniline and graphene can also be used as electrolyte.

Accordingly, in various embodiments the present invention provides for improved electrodes and associated supercapacitors formed from said inventive electrodes, thereby providing a device exhibiting improved capacitance over other structures known in the art.

BRIEF DESCRIPTION OF THE DRAWINGS

For a fuller understanding of the invention, reference should be made to the following detailed description, taken in connection with the accompanying drawings, in which:

FIG. 5A is an SEM image of a pure sponge, in accordance with an embodiment of the present invention.

FIG. 5B is a magnified image of the SEM image of the pure sponge of FIG. 5A, in accordance with an embodiment of the present invention.

FIG. 5C is an SEM image of a pure sponge/PPy, in accordance with an embodiment of the present invention.

FIG. 5D is a magnified image of the SEM image of the pure sponge/PPy substrate of FIG. 5C, in accordance with an embodiment of the present invention.

FIG. 5E is an SEM image of a pure sponge/PPy/PANI substrate (via in-situ self-assembly), in accordance with an embodiment of the present invention.

FIG. 5F is a magnified image of the SEM image of the pure sponge/PPy/PANI substrate of FIG. 5E, in accordance with an embodiment of the present invention.

FIG. 5G is an SEM image of a pure sponge/PPy/PANI/PANI-$MoS_2$ substrate (via electrochemical deposition), in accordance with an embodiment of the present invention.

FIG. 5H is a magnified image of the SEM image of the pure sponge/PPy/PANI/PANI-$MoS_2$ substrate substrate of FIG. 5G, in accordance with an embodiment of the present invention.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized, and structural changes may be made without departing from the scope of the invention.

While organic sponge, polyurethane and foam-based polystyrene based porous materials are inexpensive, they are also naturally insulating. The present invention transforms a sponge into a nearly metallic conductivity through the deposition of conducting polymer, utilizing both in-situ and electrochemical techniques. In addition to providing the substrate, the sponge also contains the hybrid network within its large surface area. which enables fabrication of a high specific capacitance based supercapacitor. As such, in various embodiments, porous materials, such as wood, foam material, honeycomb ceramics, coral, pumice, porous ceramics, open-cell polyurethane foam, aerogel, etc. can be used to make an inexpensive conducting and solid-state supercapacitor.

In various embodiments, the present invention provides a multilayer structure electrode built on a sponge substrate and a solid-state supercapacitor having a polyvinyl alcohol (PVA) gel-based electrolyte, which utilizes the novel electrode. To build the electrode in-situ, self-assembled polymerization of both PPy and PANI were used to establish a conductive surface for the subsequent electrochemical polymerization of molybdenum disulfide ($MoS_2$)-PANI nanocomposite to obtain the supercapacitor electrodes. The electrochemical study results are promising toward practical application of the multilayer electrode structure for high power and high energy density supercapacitors.

Figure 1:
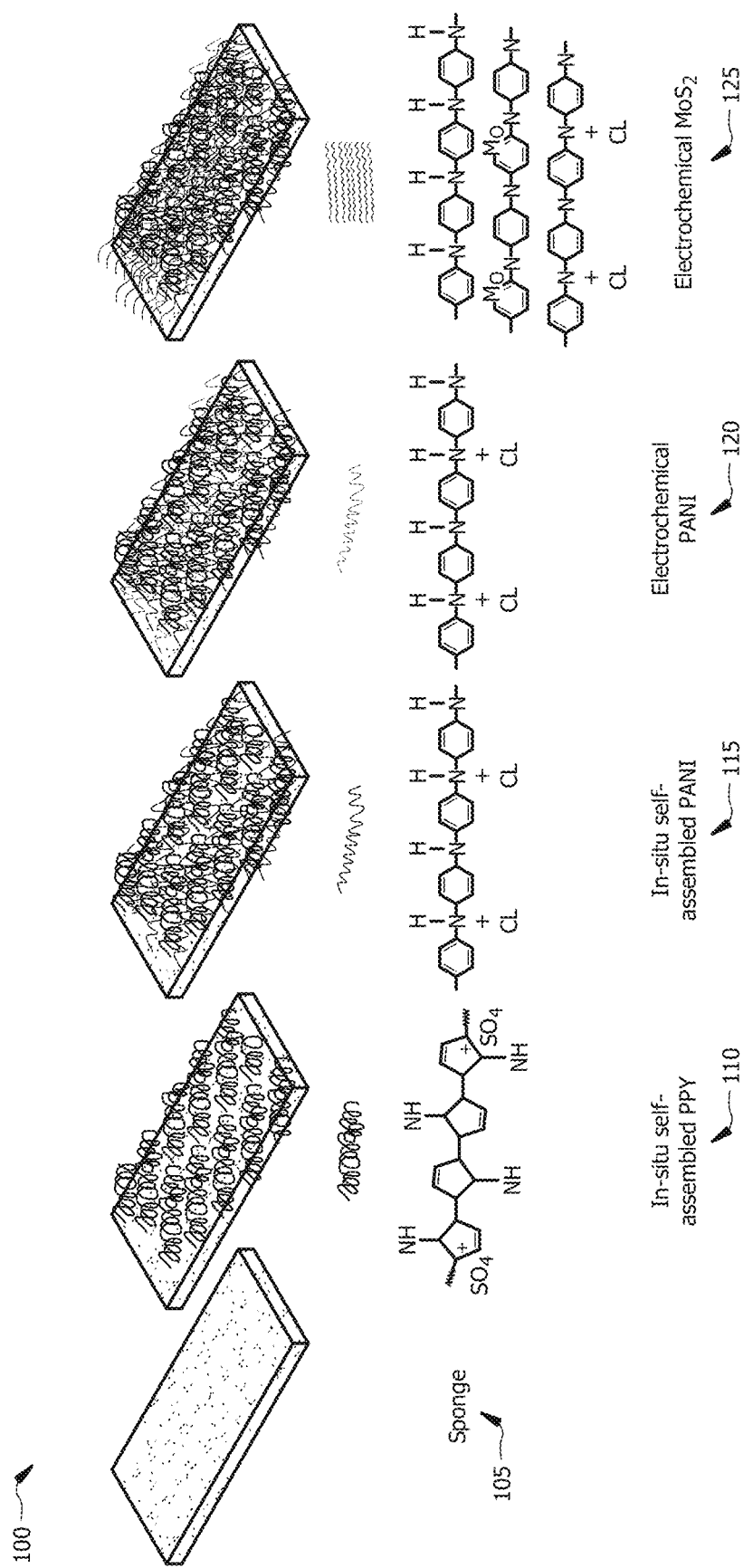
FIG. 1 is a series of images depicting the steps of electrode fabrication in which PPY, PANI and PANI-$MoS_2$ are deposited over sponge, in accordance with an embodiment of the present invention.

With reference to FIG. 1, in one embodiment the electrode fabrication steps 100, utilizing a commercial kitchen sponge are illustrated. In this embodiment, the sponge was washed in deionized water and then dipped in a polyanion solution of polystyrene sulfonate (PSS) (2 mg/ml) for 24 hours to form a sponge/PSS substrate 105. In a specific embodiment, the sponge may be a high-density foam. The PSS treatment allowed the sponge surface to absorb negative charges of anions.

Next, pyrrole (PPy) was polymerized by in-situ self-assembly polymerization over the PSS treated sponge 105 resulting in a sponge/PSS/PPy substrate 110. In a particular embodiment, 0.1M pyrrole and 0.1M para-toluene sulfonic acid were added to a 1M HCl solution, followed by 0.05M iron chloride, which was then stirred for a few seconds. The sponge/PSS substrate was then dipped in the resulting solution and held for 3 hours. The sponge/PSS/PPy was then cleaned and kept in 1M HCl solution.

A layer of polyalanine (PANI) was then deposited on the sponge/PSS/PPy substrate 110 to form a sponge/PSS/PPy/PANI substrate 115. In a particular embodiment, the PANI was deposited by in-situ self-assembled technique using a solution of 0.2M aniline, 0.1M of an oxidizing agent (ammonium persulfate, APS) in 1M HCl for a duration of 3 hours.

The second layer of PANI was then deposited on the sponge/PSS/PPy/PANI substrate 115 to form a sponge/PSS/PPy/PANI/PANI substrate 120. In a particular embodiment, the second layer of PANI was deposited by an electrochemical technique in 0.2 aniline in 1M HCl at a potential of 1.5 V for a duration of 2 hours, for each side of the sponge.

The final layer of PANI-$MoS_2$ was then electrochemically deposited over the sponge/PSS/PPy/PANI substrate 120 to form a sponge/PSS/PPy/PANI-$MoS_2$ substrate 125. In a particular embodiment the PANI-$MoS_2$ was deposited in an electrochemical cell at 1.5 V in a solution containing 0.2M aniline, 0.5 g $MoS_2$, 1 g cetrimonium bromide 'CTAB' for a duration of 2 hours. The sponge/PSS/PPy/PANI-$MoS_2$ substrate was made upside down, and further deposition was also made at 1.5 V for an additional 2 hours to complete the deposition process. These processing steps resulted in a nearly metallic conductivity in the sponge/PSS/PPy/PANI/PANI-MoS$_2$ layers.

FIG. 1 illustrates the steps 100 involved in the electrode fabrication process of the present invention and the chemical structures of the conducting polymer and its composite materials. Following the fabrication steps, the sponge/PSS/PPy/PANI-MoS$_2$ was cleaned using deionized water, and subsequently in 1M HCl, and gently squeezed to remove the acid and left to dry at room temperature for 24 hours. The sponge/PSS/PPy/PANI/PANI-MoS$_2$ electrode was subsequently used to characterize and fabricate a solid supercapacitor.

Figure 2:
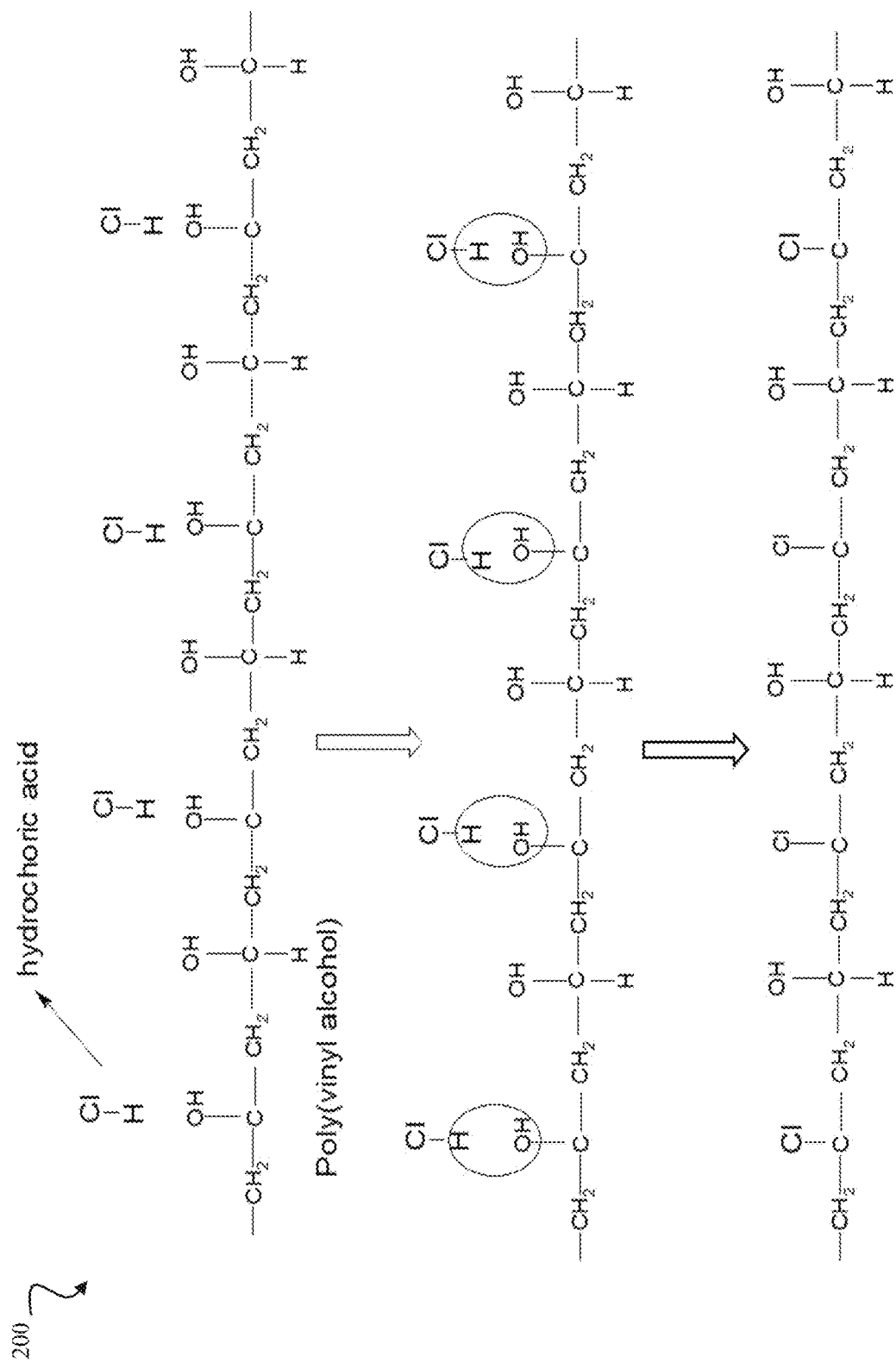
FIG. 2 is an image depicting the formation of a PVA based gel electrolyte, in accordance with an embodiment of the present invention.

For the preparation of the PVA-gel employed in the solid supercapacitor, 10 g of poly(vinyl alcohol) (PVA) was added to 100 ml of 1M HCl, which was then stirred, under heat at 80° C. for a duration 24 hours. The gel was then allowed to age for one week prior to the fabrication of the supercapacitor. FIG. 2 illustrates the structure 200 of the PVA-gel.

Figure 3:
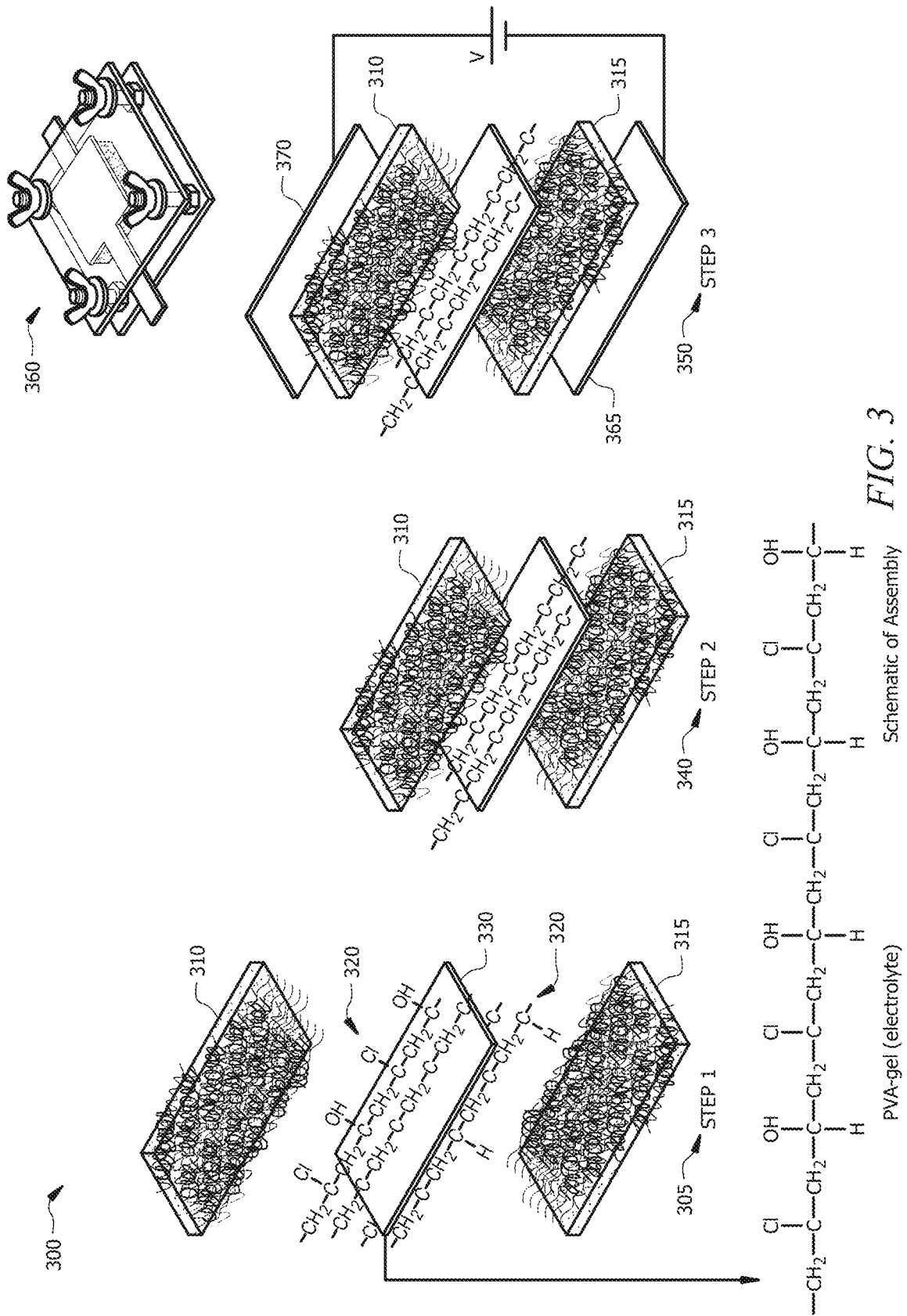
FIG. 3 is a series of images depicting the fabrication steps of a sponge-based solid supercapacitor, in accordance with an embodiment of the present invention.

FIG. 3 illustrates the methods steps 300 in the fabrication of the sponge-based solid supercapacitor of the present invention. In a first step 305 for the preparation of the supercapacitor, the sponge/PSS/PPy/PANI/PANI-MoS$_2$ was used for both electrodes 310, 315 in the symmetric supercapacitor structure. The PVA gel electrolyte 320 was applied to the electrodes 310, 315 and a porous filter paper that was used as the separator 330. The electrodes 310, 315, PVA gel 320 and separator 330 were sandwiches together in a second step 340. In a third step 350, a copper tape 365, 370 was used as the current collector for each electrode 310, 315. The completed device 360 was assembled by sandwiching two electrodes 310, 315 and the separator 330 between two layers of plexiglass and tightened with four screws.

Figure 4:
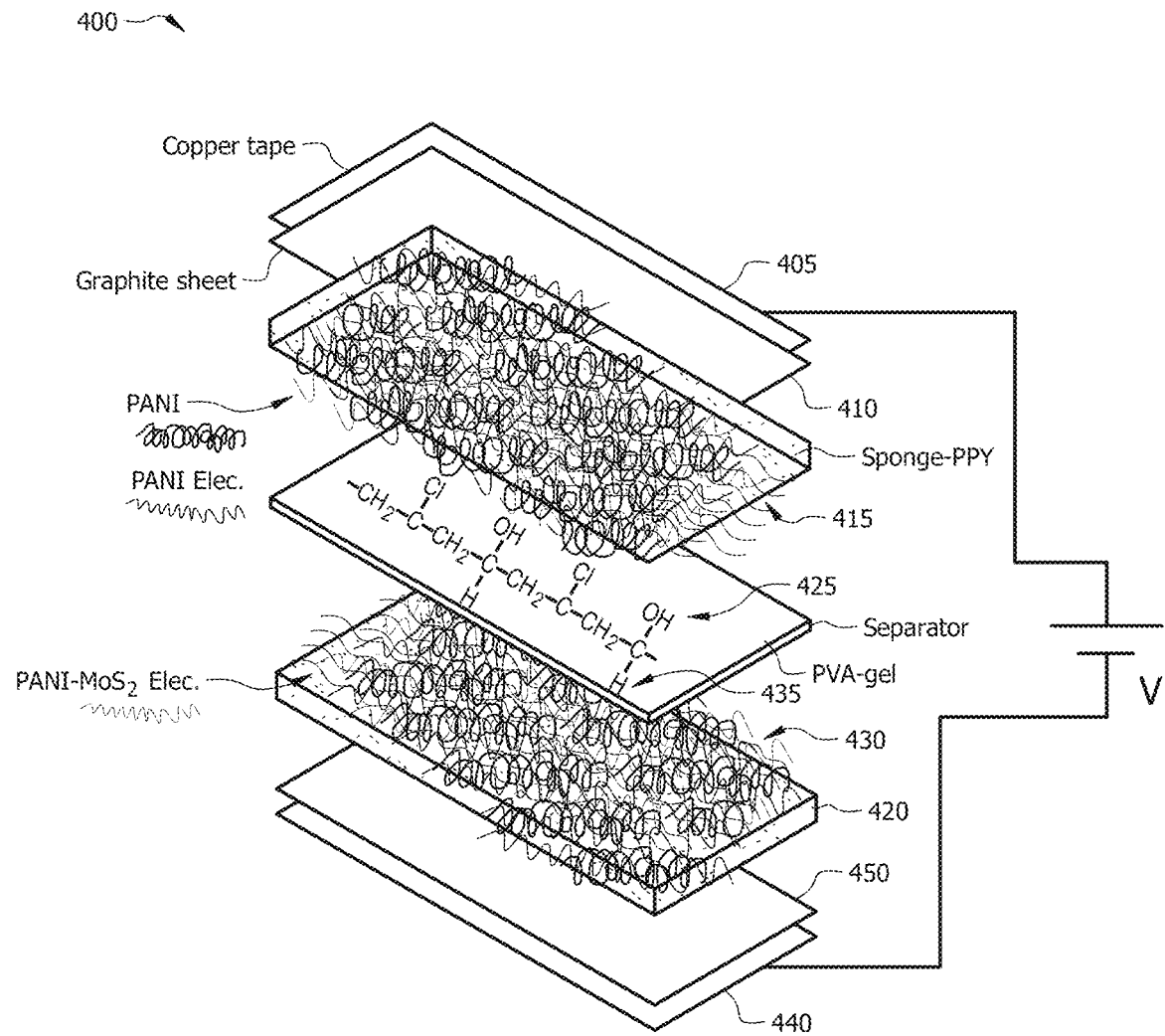
FIG. 4 is a schematic of the sponge-based supercapacitor using copper tape/graphite sheet/sponge/PSS/PPY/PANI/PANI/PANI-$MoS_2$/PVA gel/sponge/PSS/PPY/PANI/PANI/PANI-$MoS_2$/graphite sheet/copper sheet, in accordance with an embodiment of the present invention.

FIG. 4 illustrates the various layers of the sponge-based solid supercapacitor 400. In this embodiment the supercapacitor 400 includes, in order from top to bottom, a first copper tape layer 405 over a first graphite sheet 410, a first sponge/PSS/PPy/PANI/PANI-MoS$_2$ electrode 415, a first PVA gel layer 425 a separator 435, a second PVA gel layer 430, a second sponge/PSS/PPy/PANI/PANI-MoS$_2$ electrode 420, a second graphite sheet 450 and a second copper tape layer 440.

To analyze the physical and structural characteristics of the solid supercapacitor, field emission scanning electron microscopy (FE-SEM, SU70, at accelerating voltage of 5 kV) was used to image the sponge and each deposited conducting polymer, in addition to the composite structure on the sponge. FIG. 5A and FIG. 5B illustrate an SEM image of the pure sponge. FIG. 5C and FIG. 5D present images of the sponge/PPy layer. FIG. 5E and FIG. 5F present images of the sponge/PPy/PANI (via in-situ self-assembly) layer. FIG. 5G and FIG. 5H present images of the sponge/PPy/PANI/PANI-MoS$_2$ (via electrochemical deposition) layer. The structure of the sponge before and after the PPy layer is different, as shown in FIG. 5C and FIG. 5D. The smaller magnification shows equally distributed PPy particles approximately 1000 nm to 3500 nm in size. Further, the PANI deposition over PPy changed the structure, whereby nanostructures are clearly visible over the sponge surface as shown in FIG. 5E and FIG. 5F. The PANI-MoS$_2$ is a clearly distinguishable structure that is different than both PPy and PANI, following the electrochemical deposition. The MoS$_2$ platelets are observed in the PANI network in the SEM images of FIG. 5G and FIG. 5H.

Figure 6A:
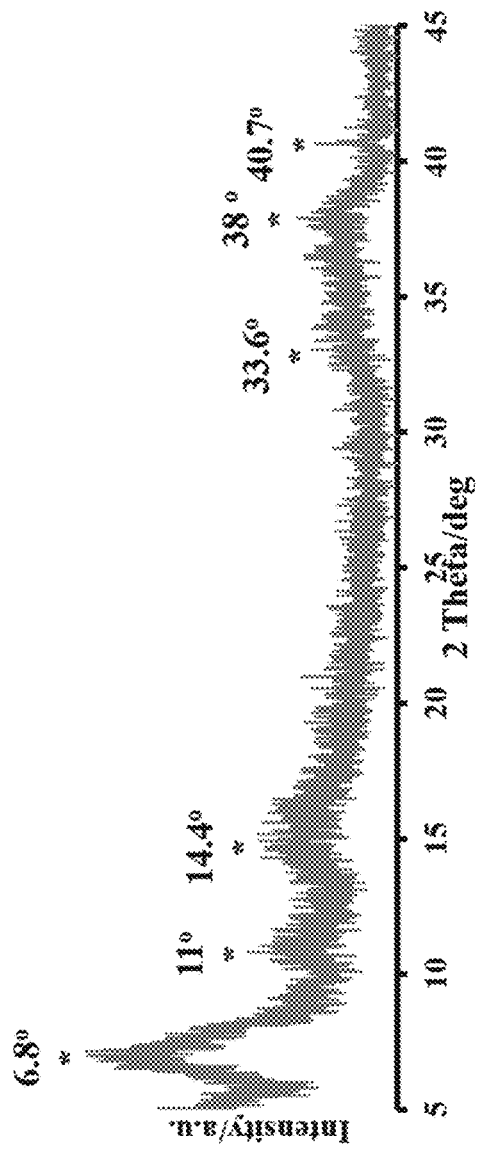
FIG. 6A is a graphical illustration of the X-ray diffraction of PPY/PANI/$MoS_2$, in accordance with an embodiment of the present invention.

A Philips Panalytical Xpert Pro MRD with Cu Kα radiation (wavelength=1.5442 Å) and 2θ range from 5° to 45° was then used to study the X-ray diffraction (XRD) of sponge/PSS/PPy/PANI-MoS$_2$. As shown in FIG. 6A, peaks for diffraction angle '2θ' at 6.8, 11, 14.4, 33.6, 38 and 40.7 degrees were found in the results. Generally, the emeraldine salt of PANI is quasi crystalline and PPY is amorphous in nature. However, the composite with MoS$_2$ structure is ordered state than the conventional PANI as well as PPy structure.

Figure 6B:
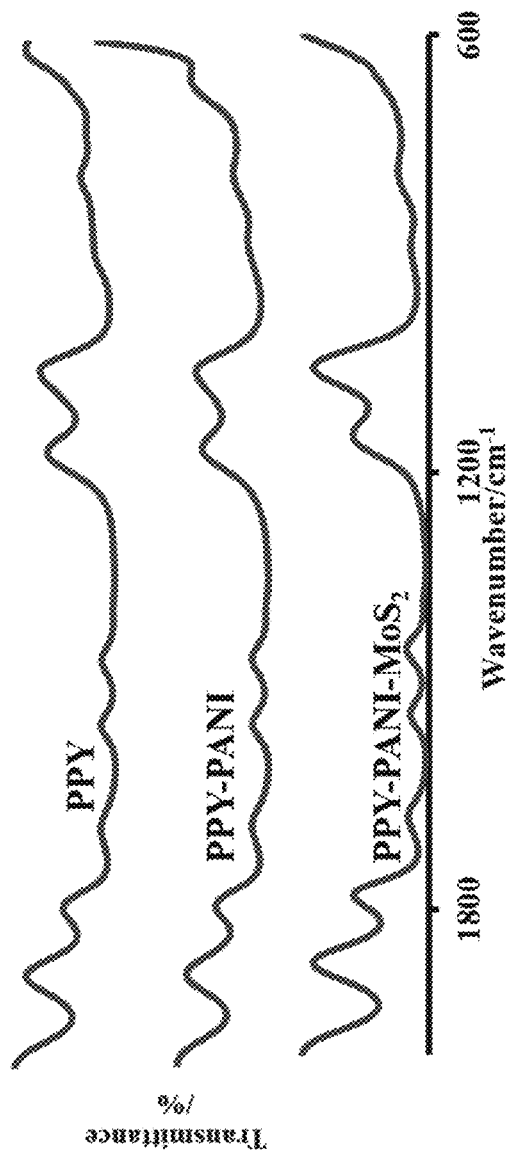
FIG. 6B is a graphical illustration of the FTIR spectra of PPY, PPY/PANI and PPY/PANI/$MoS_2$ deposited on sponges from 600-2000 $cm^1$, in accordance with an embodiment of the present invention.
Figures 7A, 7B, 7C, 7D:
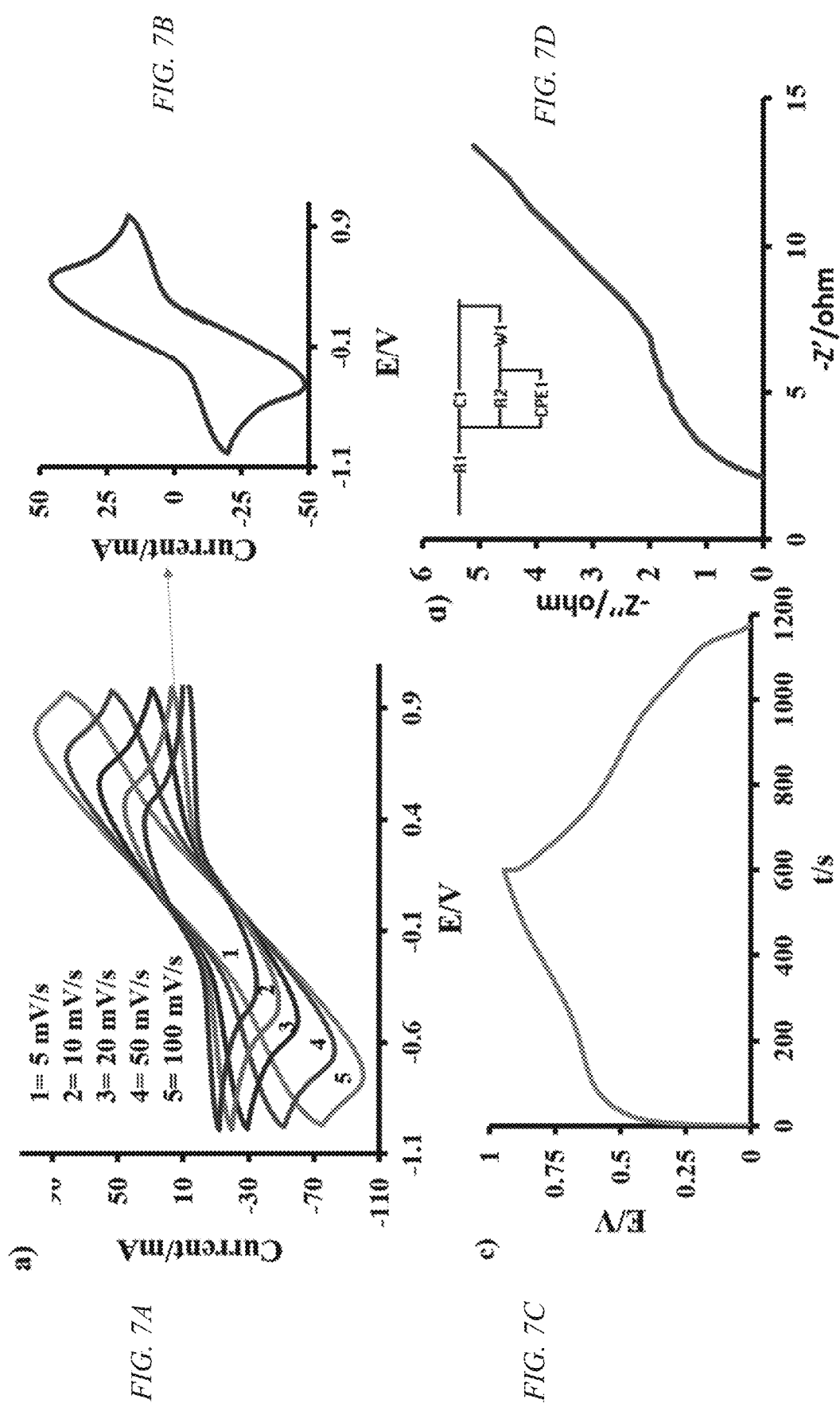
FIG. 7A is a graphical illustration of the CV as a function of scan rates at (1) 5 mV/s (2) 10 mV/s (3) 20 mV/s (4) 50 mV/s and (5) 100 mV/s, in accordance with an embodiment of the supercapacitor of the present invention.
FIG. 7B is a graphical illustration of the CV of the supercapacitor at 10 mV/s, in accordance with an embodiment of the present invention.
FIG. 7C is a graphical illustration of the specific capacitance of the supercapacitor, estimated using CV studies, in accordance with an embodiment of the present invention.
FIG. 7D is a graphical illustration of the charge/discharge cycling performance of the supercapacitor at 30 mA, in accordance with an embodiment of the present invention.

FTIR spectra of sponge/PSS/PPy, sponge/PSS/PPy/PANI and sponge/PSS/PPy/PANI/PANI-MoS$_2$ was measured using Perkin Elmer spectrometer from 600-2000 cm$^{-1}$ in the reflectance mode. In FIG. 6B, curve 1 shows the infrared peaks at 1936, 1824, 1726 ((C=N, C—N)), 1586 (C=C stretching), 1494, 1332 (C=N, C—N) bonds, 1242 (N—H plane mode), 1114 (C—H in plane mode), 972 (C—H wag), 833 (C—H waging), 749 and 694 cm$^{-1}$ [29]. Curve 2 in FIG. 6B shows the vibrational bands at 1933, 1821, 1722, 1595, 1406, 1332, 1233, 1114, 969, 824, 728, 627 cm$^{-1}$. Curve 3 in FIG. 6B shows the infrared peaks at 1940, 1822, 1729, 1600, 1490, 1394, 1338, 1215, 1114, 962, 846, 742, 867, 665 and 643 cm$^{-1}$. As illustrated, there is a decrease in the wavenumber in IR spectra after PANI was polymerized over PPy, which could be due to formation of some hydrogen bonds in the doped form of PANI. 663 cm$^{-1}$ is the characteristic shifted peak of MoS$_2$ To assess the electrochemical characteristics of the sponge-based superconductor device, electrochemical tests, including CV, CCCD and EIS, were conducted using the two-electrode configuration. FIG. 7A shows the CV curves of the device at different scan rates from 5 mV s$^{-1}$ to 100 mV s$^{-1}$. Oxidation and reduction peaks are observed at 0.34V and –0.37V, respectively, for the scan rate of 5 mV s$^{-1}$. The peaks were shifted to 0.8 V (oxidation) and –0.74V (reduction) at 100 mV s$^{-1}$ scan rate.

FIG. 7B shows the CV plot at 10 mV s$^{-1}$ scan rate to show the redox peaks. The visible redox peaks at different scan rates imply the strong charge storage via the pseudocapacitive effect in addition to the double layer effect. The highest specific capacitance of ~569 F g$^{-1}$ has been calculated from the 5 mV s$^{-1}$ CV result. FIG. 7C shows the charging and discharging behaviors of the sponge/PSS/PPy/PANI/PANI-MoS$_2$ supercapacitor with the PVA-gel electrolyte. The specific capacitance, specific power density and specific energy density have been calculated to be 631.6 Fg$^{-1}$, 475 W kg$^{-1}$ and 79.17 Wh kg$^{-1}$ considering the weight of only electrode material. In order to test the stability of the device in multiple cycles, CV results of 1500 cycles were collected when the scan rate was 100 mV s$^{-1}$. FIG. 7D shows the Nyquist plot of sponge/PSS/PPy/PANI/PANI-MoS$_2$ based supercapacitor fabricated using PVA-gel. There is a direct fitting of the Nyquist plot and the value of R1, C1, R2 and CPE1 has been estimated 297.7 μF, 2.0817 Ω, 5.180Ω and Aw1=3.041, P1=0.05 and n1=0.5889.

Figure 8:
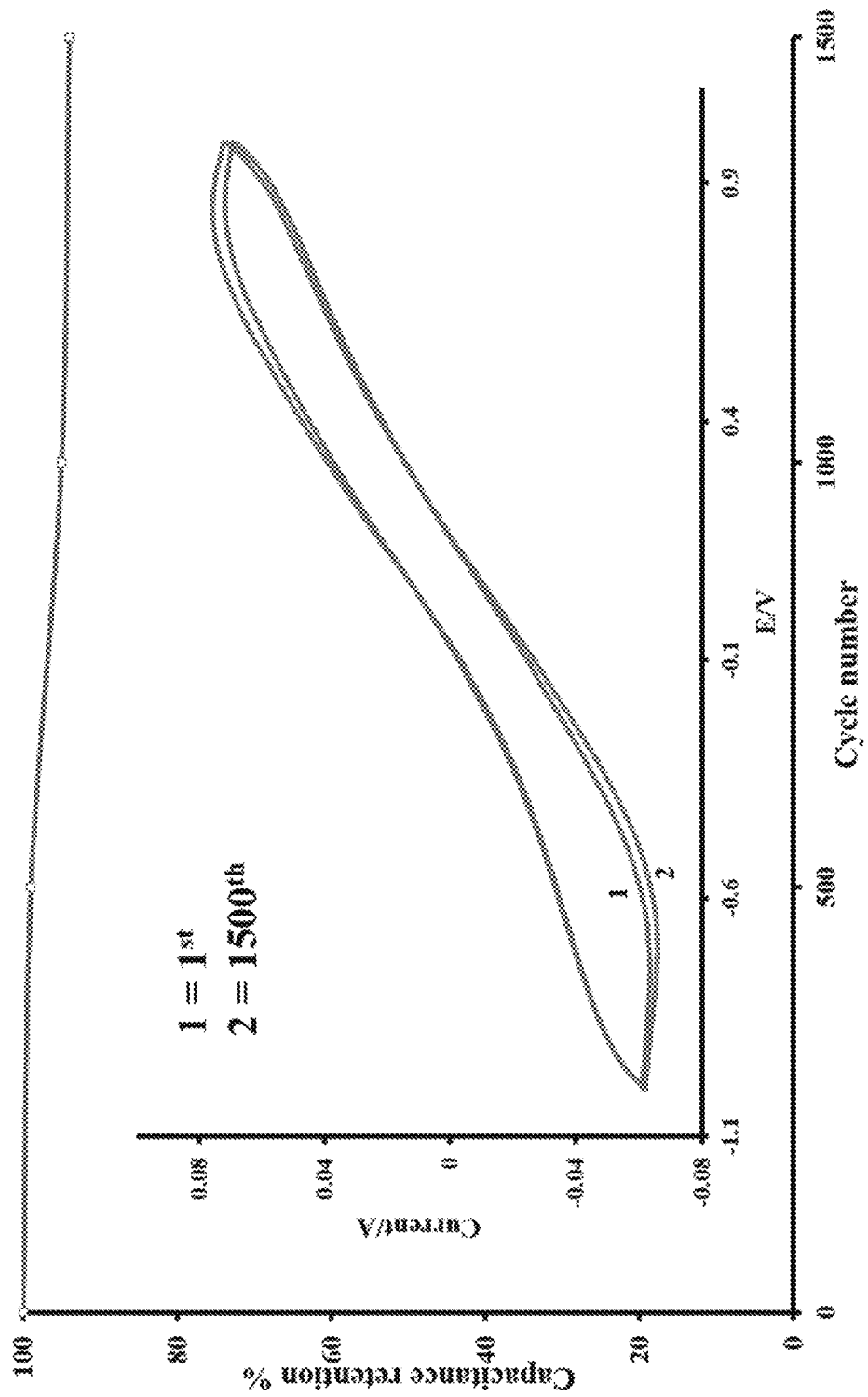
FIG. 8 is a graphical image depicting CV cycling performance at 20 mV/s for 1000 cycles (inset) CV curves collected at the $1^{st}$ and the $1000^{th}$ cycle, in accordance with an embodiment of the supercapacitor of the present invention.

FIG. 8 shows a retention of ~94% CV for cycling performance at 1000 mV s$^{-1}$ for 1500 cycles (inset) CV curves collected at the 1$^{st}$ and the 1000th cycle.

Figure 9:
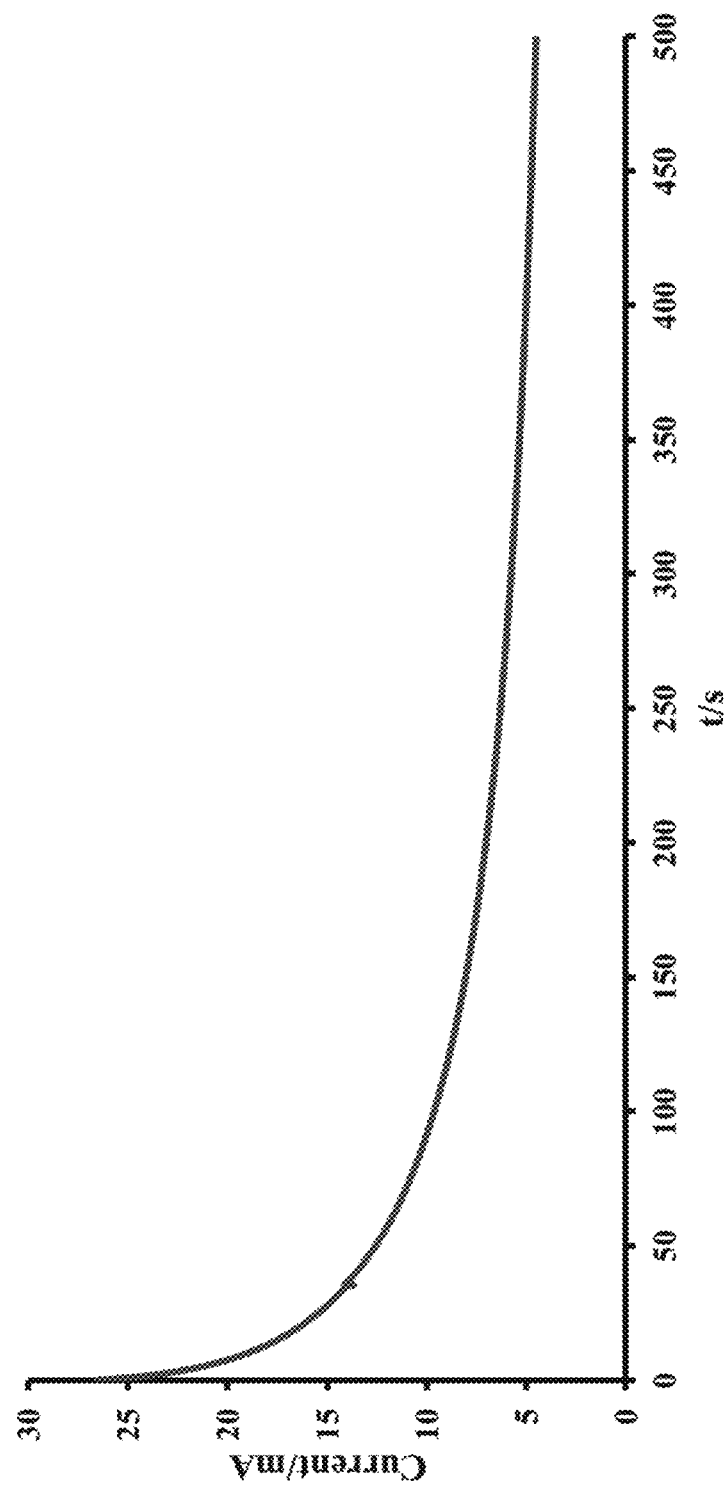
FIG. 9 is a graph depicting leakage current when charging with constant voltage of 1V over a duration of 500 seconds, in accordance with an embodiment of the supercapacitor of the present invention.
Figures 10A, 10B:
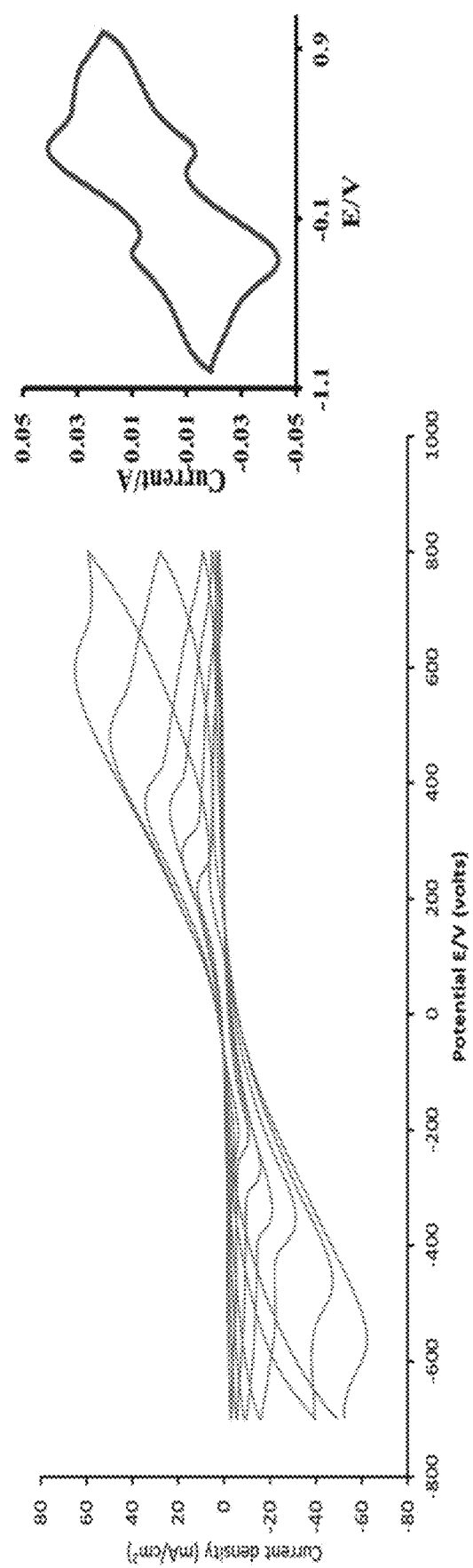
FIG. 10A is a graphical image depicting CVs curves as a function of scan rate 5, 10, 20, and 100 mV/sec of 2 years old symmetric supercapacitor based on sponge/PSS/PPY/PPY/PPY-$MoS_2$ electrode materials, in accordance with an embodiment of the supercapacitor of the present invention.
FIG. 10B is a graphical illustration of and PVA-gel as an electrolyte sec (inset) at 10 mV/s, in accordance with an embodiment of the supercapacitor of the present invention.

To study the leakage currant in the sponge supercapacitor, a constant potential of 1 V was applied for 500 seconds. By monitoring the charging currant at the end of charging cycle, it was 4.5 mA which can been corresponding to the leakage currant in the device as shown in FIG. 9. FIG. 10A illustrates CVs curves as a function of scan rate 5, 10, 20, and 100 mV/sec of symmetric supercapacitor based on 2 years old sponge/PPy/PANI/PANI-MoS$_2$ electrode materials and PVA-gel as an electrolyte. The cyclability of this 2-year-old supercapacitor is examined under long-term charge/discharge cycling over 100 cycles, which has shown a good cyclic performance and reversibility as evidenced by FIG. 10B.

Figure 11:
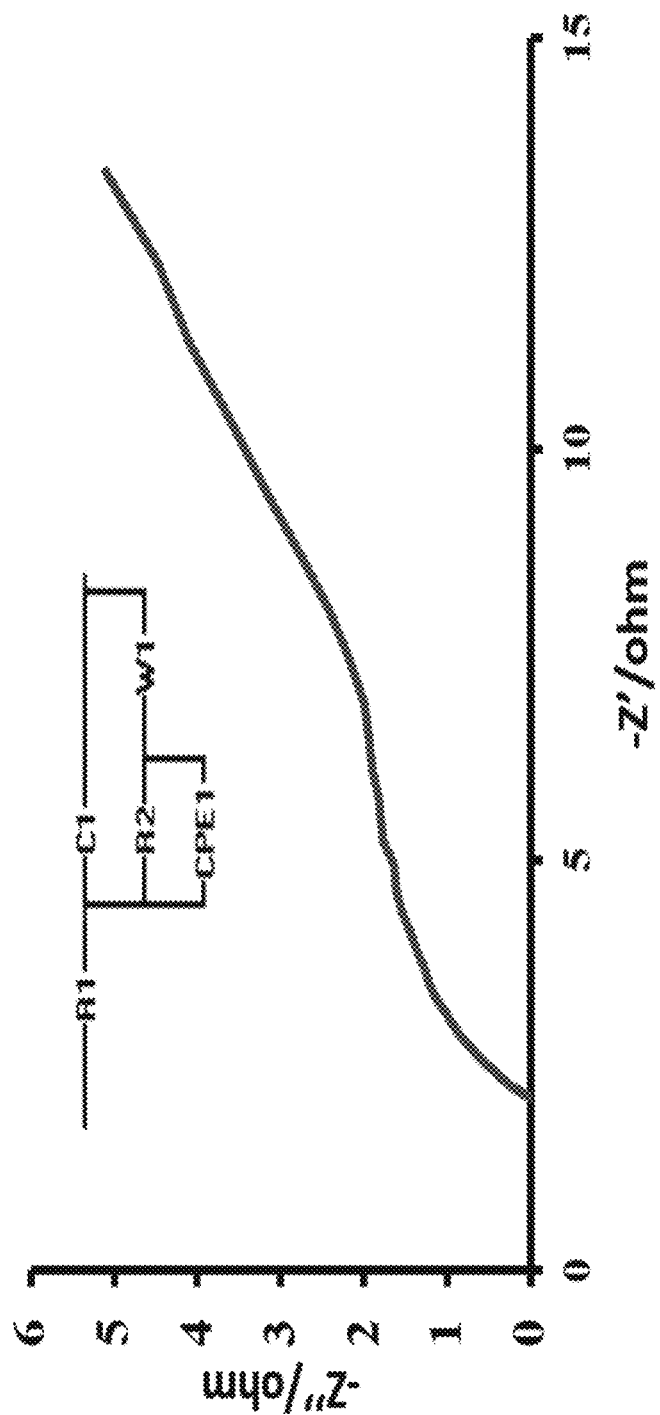
FIG. 11 is a graph depicting Nyquist plots (inset) of the applied equivalent circuit of the sponge supercapacitor, in accordance with an embodiment of the supercapacitor of the present invention.

FIG. 11 shows the Nyquist plot of sponge/PPy/PANI/PANI-MoS$_2$ based supercapacitor fabricated using PVA-gel. There is a direct fitting of the Nyquist plot and the value of R1, C1, R2 and CPE1 has been estimated. The C1 297.7 µF, R1 2.0817, R2=5.180, Aw1=3.041, P1=0.05 and n1=0.5889.

As described in detail, in various embodiments, the present invention provides a multilayer electrode structure with conducting polymers and a composite material of molybdenum disulfide (MoS$_2$) that was designed and fabricated on a kitchen sponge substrate to make solid state supercapacitors with a high specific capacitance of 631.6 F g$^{-1}$.

In various embodiments, the sponge-based electrode was fabricated by in-situ self-assembled polymerization of a layer of polypyrrole (PPy) and a layer of polyaniline (PANI) on a sponge substrate. The layers of PPy and PANI converted the sponge surface to a conductive surface that was used for the electrochemical deposition of a thicker layer of PANI and another layer of PANI-MoS$_2$-PANI composite. The polyvinyl alcohol (PVA) gel was synthesized and further, PANI, was polymerized in PVA gel to obtain highly conducting electrolyte.

The fabrication, characterization and results demonstrate that large surface area based sponge PSS/PPy/PANI/PANI-MoS$_2$ electrodes may potential use as supercapacitor electrode materials for a promising low-cost supercapacitor which exhibits good electrochemical performance with superior cycle durability, time stability and shelf life.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. An electrode comprising:
    a porous structure having absorbed polystyrene sulfonate (PSS);
    a self-assembled polypyrole (PPy) layer adjacent to the PSS absorbed porous structure;
    a self-assembled polyaniline (PANI) layer adjacent to the PPy layer;
    an electrochemically deposited PANI layer adjacent to the PPy layer; and
    an electrochemically deposited PANI-molybdenum disulfide (PANI-MoS$_2$) layer adjacent to the electrochemically deposited PANI layer.

2. The electrode of claim 1, wherein the porous structure is selected from a sponge, an organic sponge, open-cell polyurethane form polystyrene, wood, foam, honeycomb ceramics, coral, pumice, porous ceramics and aerogel.

3. The electrode of claim 1, wherein the self-assembled PANI layer further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide (TiO$_2$), tungsten oxide (WO$_3$), nanodiamond, zinc oxide over polyaniline film.

4. The electrode of claim 1, wherein the electrochemically deposited PANI layer further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide (TiO$_2$), tungsten oxide (WO$_3$), nanodiamond, zinc oxide over polyaniline film.

5. A supercapacitor comprising:
    a first electrode comprising;
        a porous structure having absorbed polystyrene sulfonate (PSS);
        a self-assembled polypyrole (PPy) layer adjacent to the PSS absorbed porous structure;
        a self-assembled polyaniline (PANI) layer adjacent to the PPy layer;
        an electrochemically deposited PANI layer adjacent to the PPy layer;
        an electrochemically deposited PANI-molybdenum disulfide (PANI-MoS$_2$) layer adjacent to the electrochemically deposited PANI layer;
    a second electrode comprising;
        a porous structure having absorbed polystyrene sulfonate (PSS);
        a self-assembled polypyrole (PPy) layer adjacent to the PSS absorbed porous structure;
        a self-assembled polyaniline (PANI) layer adjacent to the PPy layer;
        an electrochemically deposited PANI layer adjacent to the PPy layer;
        an electrochemically deposited PANI-molybdenum disulfide (PANI-MoS$_2$) layer adjacent to the electrochemically deposited PANI layer;
    a first polyvinyl alcohol (PVA) layer positioned adjacent to the PANI-MoS$_2$ layer of the first electrode;
    a second polyvinyl alcohol (PVA) layer positioned adjacent to the PANI-MoS$_2$ layer of the first electrode; and
    a separator positioned between the first PVA layer and the second PVA layer.

6. The supercapacitor of claim 5, wherein the porous structure of the first electrode and the second electrode is selected from a sponge, an organic sponge, open-cell polyurethane form polystyrene, wood, foam, honeycomb ceramics, coral, pumice, porous ceramics and aerogel.

7. The supercapacitor of claim 5, wherein the self-assembled PANI layer of the first electrode and the second electrode further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide ($TiO_2$), tungsten oxide ($WO_3$), nanodiamond, zinc oxide over polyaniline film.

8. The supercapacitor of claim 5, wherein the electrochemically deposited PANI layer of the first electrode and the second electrode further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide ($TiO_2$), tungsten oxide ($WO_3$), nanodiamond, zinc oxide over polyaniline film.

9. The supercapacitor of claim 5, wherein the first electrode and the second electrode further comprises a copper tape layer adjacent to the PSS porous structure.

10. The supercapacitor of claim 9, wherein the first electrode and the second electrode further comprises a graphic sheet layer adjacent to the copper tape layer.

11. The supercapacitor of claim 5, wherein the separator is a porous filter paper.

12. The supercapacitor of claim 5, wherein the PVA gel further comprise graphene.

13. A method for manufacturing an electrode, the method comprising:
   contacting a porous structure with a polyanion solution of polystyrene sulfonate (PSS) to form a porous structure/PSS substrate;
   performing in-situ self-assembly polymerization of pyrrole (PPy) on the porous structure/PSS substrate to form a porous structure/PSS/PPy substrate;
   performing in-situ self-assembly polymerization of polyaniline (PANI) on the porous structure/PSS/PPy substrate to form a porous structure/PSS/PPy/PANI substrate;
   electrochemically depositing a layer of PANI on the porous structure/PSS/PPy/PANI substrate to form a porous structure/PSS/PPy/PANI/PANI substrate; and
   electrochemically depositing a polyaniline molybdenum disulfide (PANI-$MoS_2$) layer over the porous structure/PSS/PPy/PANI/PANI substrate to form a porous structure/PSS/PPy/PANI/PANI/PANI-$MoS_2$ electrode.

14. The method of claim 13, wherein the porous structure is selected from a sponge, an organic sponge, open-cell polyurethane form polystyrene, wood, foam, honeycomb ceramics, coral, pumice, porous ceramics and aerogel.

15. The method of claim 13, wherein the self-assembled PANI layer further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide ($TiO_2$), tungsten oxide ($WO_3$), nanodiamond, zinc oxide over polyaniline film.

16. The method of claim 13, wherein the electrochemically deposited PANI layer further comprises one or more of, PANI-dichalcogenide, polyaniline derivatives (poly-toluidine, poly(ortho-anisidine), poly(methyl aniline), poly(ortho-ethoxyaniline) and its derivatives, polythiophene 'PTh', polyethylenedioxythiophene (PEDOT), polyhexylthiophene (PHTh), conducting methyl substituted polyaniline, conducting polymer copolymer (poly(aniline-pyrrole) conducting polymer nanocomposite films with graphene (G), carbon nanotubes tin oxide, titanium oxide ($TiO_2$), tungsten oxide ($WO_3$), nanodiamond, zinc oxide over polyaniline film.

17. A method of manufacturing a supercapacitor, the method comprising:
   manufacturing a first electrode and a second electrode by the process comprising;
      contacting a porous structure with a polyanion solution of polystyrene sulfonate (PSS) to form a porous structure/PSS substrate;
      performing in-situ self-assembly polymerization of pyrrole (PPy) on the porous structure/PSS substrate to form a porous structure/PSS/PPy substrate;
      performing in-situ self-assembly polymerization of polyaniline (PANI) on the porous structure/PSS/PPy substrate to form a porous structure/PSS/PPy/PANI substrate;
      electrochemically depositing a layer of PANI on the porous structure/PSS/PPy/PANI substrate to form a porous structure/PSS/PPy/PANI/PANI substrate; and
      electrochemically depositing a polyaniline molybdenum disulfide (PANI-$MoS_2$) layer over the porous structure/PSS/PPy/PANI/PANI substrate to form a porous structure/PSS/PPy/PANI/PANI/PANI-$MoS_2$ electrode;
   applying a first polyvinyl (PVA) gel layer to the PANI-$MoS_2$ layer of the porous structure/PSS/PPY/PANI/PANI/PANI-$MoS_2$ first electrode;
   positioning a separator on the PVA gel layer;
   applying a second PVA gel layer between the separator and the PANI-$MoS_2$ layer of the porous structure/PSS/PPY/PANI/PANI/PANI-$MoS_2$ second electrode;
   positioning a first graphite sheet covered with copper tape on an exterior side of the first electrode; and
   positioning a second graphite sheet covered with copper tape on an exterior side of the second electrode to form the supercapacitor.

18. The method of claim 17, wherein the porous structure of the first electrode and the second electrode is selected from a sponge, an organic sponge, open-cell polyurethane form polystyrene, wood, foam, honeycomb ceramics, coral, pumice, porous ceramics and aerogel.

19. The method of claim 17, wherein the separator is a porous filter paper.

20. The method of claim 17, wherein the PVA gel further comprise graphene.

* * * * *